US012499250B2

(12) United States Patent
Kapadia

(10) Patent No.: US 12,499,250 B2
(45) Date of Patent: Dec. 16, 2025

(54) AUTOMATIC GENERATION OF SECURITY LABELS TO APPLY ENCRYPTION

(71) Applicant: Microsoft Technology Licensing, LLC, Redmond, WA (US)

(72) Inventor: Paras Pankaj Kapadia, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 512 days.

(21) Appl. No.: 17/528,801

(22) Filed: Nov. 17, 2021

(65) Prior Publication Data

US 2023/0153447 A1 May 18, 2023

(51) Int. Cl.
*G06F 21/60* (2013.01)
*G06F 3/0482* (2013.01)
*G06F 21/62* (2013.01)

(52) U.S. Cl.
CPC .......... *G06F 21/604* (2013.01); *G06F 3/0482* (2013.01); *G06F 21/6227* (2013.01); *G06F 2221/2141* (2013.01)

(58) Field of Classification Search
CPC ......... G06F 2221/2141; G06F 21/6227; G06F 3/0482; G06F 21/604; G06F 2221/2107; G06F 2221/2113; G06F 21/6209; G06F 21/6218; H04L 63/0428; H04L 63/105; H04L 63/205
See application file for complete search history.

(56) References Cited

U.S. PATENT DOCUMENTS

| | | | |
|---|---|---|---|
| 8,989,386 B2 * | 3/2015 | Falk | H04L 9/0891 380/278 |
| 11,929,155 B1 * | 3/2024 | Schoenberg | G16H 80/00 |
| 2018/0109574 A1 | 4/2018 | Vigoda et al. | |
| 2018/0232528 A1 * | 8/2018 | Williamson | G06F 21/6245 |
| 2020/0074091 A1 * | 3/2020 | Jain | H04L 9/0894 |
| 2020/0241769 A1 | 7/2020 | Dain et al. | |
| 2021/0344485 A1 | 11/2021 | Levin et al. | |
| 2023/0098281 A1 * | 3/2023 | Nainar | G06V 40/173 |

OTHER PUBLICATIONS

"Executive Order on Improving the Nation's Cybersecurity", In White House, May 12, 2021, 18 Pages.
Bailey, et al., "Create and configure sensitivity labels and their policies", Retrieved from: https://docs.microsoft.com/en-us/microsoft-365/compliance/create-sensitivity-labels?view=o365-worldwide, Aug. 26, 2021, 12 Pages.
"International Search Report and Written Opinion Issued in PCT Application No. PCT/US22/041290", Mailed Date: Dec. 2, 2022, 12 Pages.

* cited by examiner

*Primary Examiner* — Sangseok Park

(57) ABSTRACT

Non-limiting examples of systems, methods, and devices for automatically generating security labels are disclosed herein. In an implementation, generation of security labels is automated to enforce security policies and prevent data leaks. For example, characteristics identified in telemetry data (e.g., collaborators, workgroups, internal users, external users, file content, terms etc.) may be used to automatically generate sensitivity labels and corresponding encryption policies. In another implementation, a user interface may be rendered comprising descriptions of the generated security labels that allow for selection of the labels, which results in the implementation of the security label.

17 Claims, 6 Drawing Sheets

AUTOMATIC GENERATION OF SECURITY LABELS TO APPLY ENCRYPTION

TECHNICAL FIELD

Aspects of the disclosure are related to the field of information security and, in particular, to security labels and associated technology.

TECHNICAL BACKGROUND

Protection of electronic assets (e.g., documents, sites, emails, etc.) is a paramount concern to organizations. However, to complete assignments, members of an organization often collaborate with others both inside and outside of their organizations. As a result, electronic assets no longer stay behind a firewall of the organization and instead roam across devices, applications, services, etc., which can increase an organization's exposure to malicious cyberattacks and/or unwanted access.

Safeguards such as sensitivity labels may be used to protect an organization's electronic assets, but existing methods for creating sensitivity labels require the efforts of a user (e.g., an account administrator) to identify, create, and configure the security label. For example, the user determines the use cases that require a sensitivity label, a name for the label (e.g., confidential, highly confidential, public, etc.), defines a scope for the label (e.g., apply to files, apply to emails, apply to groups, apply to sites, etc.), and configures an encryption policy that defines access restrictions for users and groups under the label. The user may then publish the security label to make it available to users in applications and other services Reliance on a user to determine the appropriate taxonomy of security labels and the breadth of users who should have access under the various labels, can fail to provide adequate protection, fail to provide swift implementation, and/or fail to provide a predictable mechanism for ensuring the security of electronic assets. For example, electronic assets may remain vulnerable for months while a user researches the boundaries of collaboration groups (e.g., a user may be unaware of which efforts are collaborative and/or incapable of identifying meaningful workgroups that are not obviously visible). Such user-based label generation typically has slow or little to no adoption of security labels, which can leave electronic assets exposed and/or otherwise insecure. When such user-based label generation is adopted, it often results in the creation of generic encryption policies that may fail to provide adequate protection (e.g., a label that allows all employees of a company to have access).

The subject matter claimed herein is not limited to embodiments that solve any disadvantages or that operate only in the environments described above. Rather, this background is only provided to illustrate an exemplary technology area in which some embodiments described herein may be practiced.

OVERVIEW

This Overview is provided to introduce a selection of concepts in a simplified form that are further described below in the Detailed Description section. This Overview is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for automatically generating sensitivity labels. As an example, feature vectors (e.g., signal data) may be generated from the telemetry data of a user and/or tenant in a multi-tenant environment. The feature vectors may be analyzed by a trained model (e.g., a trained artificial intelligence (AI)/machine learning (ML) model) to automatically generate security labels. The trained model may extract from the feature vectors boundaries of user workgroups (e.g., team members, etc.), characteristics of the workgroup (e.g., members of a workgroup who are internal to an organization, members of a workgroup who are external to an organization, etc.), topics on which the workgroup collaborates, content of the electronic assets on which the work group collaborates, and the like. The trained model may generate high value, frequently used terms that can represent and/or be incorporated into a security label important to a user and/or tenant. For example, a name for the security label, users associated with the security label, and/or an encryption policy of the security label may be generated by the trained model based on the extracted information.

A graphical user interface may be generated comprising recommendations and/or descriptions of the generated security labels. The user interface may be surfaced in a computer display and include a selectable element for applying the automatically generated security label. Alternatively, the automatically generated security label may be surfaced as a selectable element. In response and/or subsequent to detecting a selection of the selectable element, one or more of the automatically generated security labels may be published and their corresponding encryption policies applied to one or more electronic assets of the user and/or tenant.

BRIEF DESCRIPTION OF THE DRAWINGS

Non-limiting and non-exhaustive examples are described with reference to the following figures.

DETAILED DESCRIPTION

Figure 1:
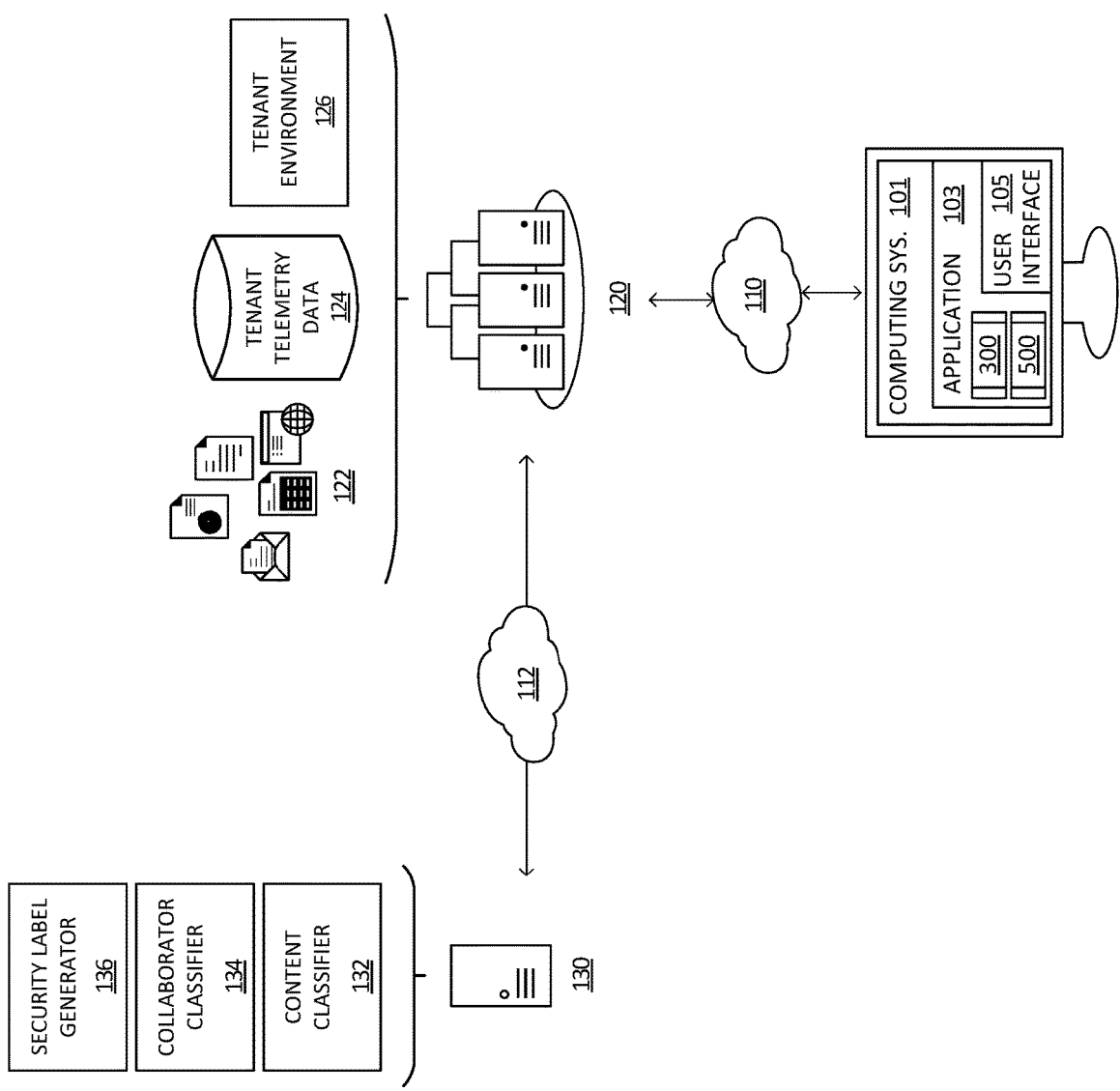
FIG. 1 is a schematic diagram illustrating an example distributed computing environment for the automatic generation of security labels.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Non-limiting examples of systems, methods, and devices for automatically generating security labels are disclosed herein. Security labels may be implemented to enhance protection of electronic assets. For example, security labels can provide protection settings that include encryption and content markings, protect content in applications across different platforms and devices, protect content in third-party applications and services, and protect containers that include groups and/or collaboration sites used by internal and/or external collaborators.

Existing solutions for creating labels require a user and/or tenant administrator to define organizational boundaries by, for example, researching (e.g., talking to organization leaders and other stakeholders) to identify members of collaboration groups, determine which documents are sensitive, and determine which level of protection is appropriate. This process can leave vulnerable assets exposed for months (e.g., when a tenant in a multi-tenant environment has 1,000 or more users that each generate and/or access potentially sensitive documents). Alternatively, existing solutions may provide a default label (e.g., a base level protection setting) that may get applied to all content of a user and/or tenant. However, without user training and other controls, this setting may result in inaccurate labeling of electronic assets. Inaccurate labeling can result in blocked access to a document (e.g., when users of an organization share documents with external users who do not have applications that support the encryption and/or who use an account that cannot be authorized) as well as allow users to access documents that should be confidential to said users.

Telemetry data may be collected from one or more tenants of a multi-tenant environment and analyzed to generate signals for use in AI/ML models. Multitenancy is a type of architecture where multiple tenants share the same physical instance of an application. Although tenants share physical resources such as virtual machines, storage, etc., each tenant gets its own logical instance of the application. Additionally, each tenant's data is isolated from exposure to other tenants and may be further segregated according to, for example, various business units of a tenant. Though various embodiments are described in a context of a multi-tenant, networked computing environment, those skilled in the art will readily understand that the disclosed systems, devices, and methods can be readily implemented in other computing environments.

In embodiments, a machine learning environment employs an AI/ML model trained to extract meaningful workgroups as well as the content of the workgroup's collaboration efforts (e.g., from signals generated based on telemetry data). The extracted information may be used to generate security labels for recommendation to a user and/or tenant. The generated security labels may provide protection policies that include encryption and/or content markings for electronic assets. For example, selection of a label applicable to confidential documents may cause the label to be published and the content of the corresponding documents to be encrypted and/or to have a "Confidential" watermark applied. Content markings may include headers and footers as well as watermarks; encryption may prevent unauthorized access as well as restrict what actions authorized users can take with respect to an encrypted file, document, email, site, etc.

The systems, methods, and devices described herein provide an inventive means for generating security labels to apply encryption. As noted above, existing solutions fail to provide adequate security for electronic assets. The systems, methods, and devices for automatically generating security labels described herein provide an improvement over existing solutions at least by providing an automatic means for creating, generating, and/or producing security labels using feature vectors derived from telemetry data. For example, meaningful, frequently used terms of identified organizations, workgroups, etc. may be leveraged to generate one or more security labels that provide adequate protection (e.g., encryption) of a tenant's electronic assets.

Referring now to the drawings, FIG. 1 is a schematic diagram illustrating an example distributed computing environment 100 for automatically generating security labels for a tenant of a multi-tenant environment of products and services. Distributed computing environment 100 includes computing system 101, networks 110 and 112, shared physical resources 120, and server computing device 130. Computing system 101 is representative of any physical or virtual computing resource, or combination thereof, suitable for executing application 103, of which computing device 600 is representative. Examples of computing system 101 include, but are not limited to, personal computers, laptop computers, tablet computers, mobile phones, wearable devices, external displays, virtual machines, and containers, as well as any variation, combination, or collection thereof.

Figure 3:
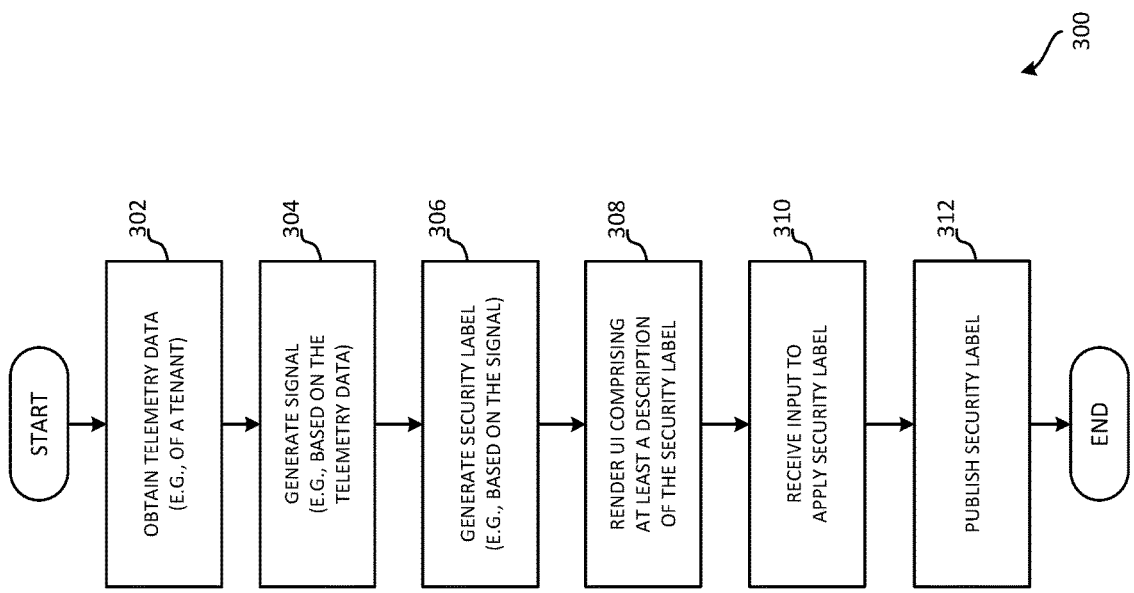
FIG. 3 illustrates a method for an implementation of automatically generating security labels.

Application 103 is implemented in software and, when executed by computing system 101, renders user interface 105. Application 103 is implemented in program instructions that comprise various software modules, components, and other elements of the application. Label generation operation 300 (as illustrated by process 300 of FIG. 3) and training process 500 (as illustrated by process 500 of FIG. 5) are representative of some of the functionality that may be provided by one or more of the software elements in application 103. Some commercial examples of application 103 include, but are not limited to, Microsoft® 365, Proofpoint® Cloud Security, Microsoft® Compliance Center, Titus Encryption, etc. Application 103 may be a locally installed and executed application, a desktop application, a mobile application, a streamed (or streaming) application, a web-based application that is executed in the context of a web-browser, or any other type of application capable of employing label generation operation 300 and training process 500.

Shared physical resources 120 is illustrative of one or more servers that may host one or more application services (e.g., application services 122), telemetry data generated for one or more tenants (e.g., telemetry data 124), and/or one or more tenant environments (e.g., tenant environment 126). Computing device 600 is representative of shared physical resources 120. In some embodiments, shared physical resources 120 includes server computing device 130.

Application services 122 may include one or more of personal information management services (email, calendar, etc.), document productivity services (word processing, spreadsheets, presentations, and collaboration, etc.), telecommunication services (voice calls, video conferencing, etc.), gaming services, social networking services, media services (music, videos, etc.), and e-commerce services, as well as any other service, combination of services, or variations thereof. Application services 122 may also include services for employing label generation operation 300 (not shown) and training process 500 (not shown).

Telemetry data 124 includes operating system data, application data, usage data, tenant identifiers (e.g., tenant name, tenant domain, unique identifiers, ip address, etc.), event logs, and the like. Telemetry data 124 may also include diagnostics data, census data, measurement data, statistical data, and the like.

Tenant environment 126 includes a tenant created for a specific subscriber/customer/client of a SaaS product. The tenant provides a group of users, who share a common access, with specific privileges to the SaaS product. Tenant environment 126 may comprise a multitenancy architecture where multiple tenants share the same physical instance of an application (e.g., application 103). Although tenants share physical resources such as virtual machines, storage, etc. (e.g., shared physical resources 120), each tenant gets its own logical instance of the application. Application data of a tenant is siloed such that the application data may be shared among users within a tenant but not shard with other tenants. Tenant environment 126 may generate at least some portion of telemetry data 124 (e.g., all of telemetry data 124, less than all of telemetry data 124, etc.).

Server computing device 130 is illustrative of one or more servers that may host one or more AI/ML services (e.g., label generation operation 300, training process 500, etc.), of which computing device 600 is representative. Telemetry data and/or one or more signals generated based on the telemetry data may be supplied to server computing device 130 and processed using content classifier 132 (e.g., to identify and/or classify content), collaborator classifier 134 (e.g., to identify and/or classify collaborators), and security label generator 136 (e.g., to automatically generate security labels). For example, server computing device 130 may employ content classifier 132 to detect, identify, and/or determine meaningful, frequently used terms that can represent a security label important to a user and/or tenant. Content classifier 132 may also be employed to detect, identify, and/or determine a sensitive asset based on the content of an electronic asset. The content of an electronic asset may trigger an electronic asset to acquire a "sensitive" designation when the content comprises confidential information, proprietary business data, nonpublic information, and the like. Server computing device 130 may be trained (e.g., via training process 500) to detect, identify, and/or determine terms that can represent a security label important to a user and/or tenant and which aspects of an electronic asset represent sensitive content.

Collaborator classifier 134 may be employed by server computing device 130 to detect, identify, and/or determine which users are in a working group (e.g., collaborating on one or more documents, projects, and the like). Server computing device 130 may be trained (e.g., via training process 500) to detect, identify, and/or determine which user behaviors represent a workgroup.

Security label generator 136 may be employed by server computing device 130 to automatically generate security labels (e.g., based on the output of content classifier 132 and/or collaborator classifier 134). Server computing device may be trained (e.g., via training process 500) to generate security labels.

Any of the computing devices described herein may communicate with one another via a network (e.g., the Internet). For example, server computing device 130 may communicate with shared physical resources 120 via network 112 and computing system 101 may communicate with shared physical resources 120 via network 110. Examples of networks and/or network connections include internets and intranets, the Internet, wired and wireless networks, low power wireless links, local area networks (LANs), and wide area networks (WANs).

Figure 2:
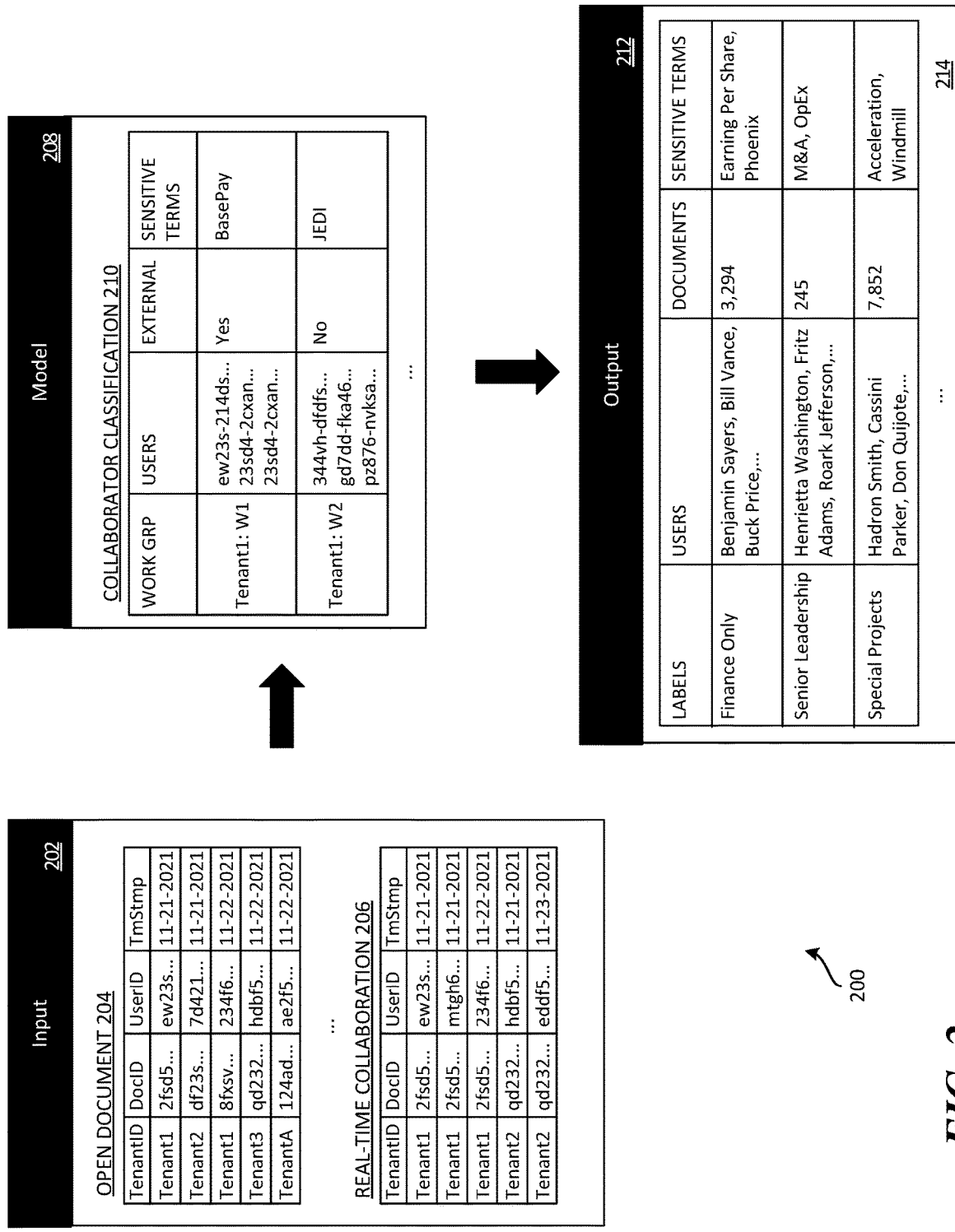
FIG. 2 is a schematic diagram illustrating an implementation of automatically generating security labels.

FIG. 2 illustrates a simplified operational scenario 200 in an implementation of automatically generating security labels. Referring parenthetically to the steps illustrated in FIG. 3, input engine 202 of a label generation service (e.g., a service hosted by shared physical resources 120, server computing device 130, and/or computing system 101 of FIG. 1) may employ label generation operation 300 to access, retrieve, receive, and/or otherwise obtain telemetry data of one or more tenants (e.g., from one or more tenant environments, from a storage location hosting telemetry data, etc.) (step 302). The telemetry data may include operating system data, application data, usage data, tenant identifiers, event logs, diagnostics data, census data, measurement data, statistical data, and the like. The telemetry data may also comprise data collected for one or more tenants over a period of time (e.g., once a day, multiple times a day, multiple days, etc.). For example, usage logs of a tenant may be collected for a week, a month, etc. and aggregated to form a single, tenant dataset that can be stored, processed, and/or analyzed.

Input engine 202 of the label generation service may create, generate, and/or produce one or more feature vectors (i.e., signals) based on the telemetry data (step 304). In an embodiment, input engine 202 generates multiple feature vectors (e.g., open document vector 204 and real-time collaboration vector 206) based on filtering telemetry data into groups that include characteristics for identifying meaningful terms and sensitive assets. For example, open document vector 204 is a feature vector for documents having an "open" status and includes tenant identifiers, document identifiers, user identifiers, and time stamp data. Real-time collaboration vector 206 is a feature vector for real-time collaboration events and includes tenant identifiers, document identifiers, user identifiers, and time stamp data. Though the present embodiment describes only two feature vectors, it is contemplated herein that additional feature vectors may also be generated based on the characteristics of the telemetry data. Input engine 202 may supply the one or more features vectors to model 208.

Model 208 may analyze the one or more feature vectors of input engine 202 to generate one or more security labels (step 306). Model 208 may include a supervised learning model, an unsupervised learning model, and/or a combination of supervised and unsupervised learning models. Model 208 may be trained using manually created inputs (e.g., manually created feature vectors for identifying terms, sensitive content, workgroups, etc.) and/or using inputs derived from tenant telemetry data (e.g., by consuming feature vectors generated based on leading indicators of sensitive content identified in telemetry data of one or more tenants).

In an embodiment, model 208 comprises classification module 210. Classification module 210 extracts from the telemetry data (e.g., via a feature vector) meaningful information regarding collaborators (e.g., user identities, whether users are internal or external to an entity, topics that relevant users collaborate on, etc.) and/or terms (e.g., BasePay, JEDI). Classification module 210 may use the meaningful information to generate high value/meaningful terms that define the metes, limits, and/or boundaries of the security label. For example, workgroups Tenant1: W1 and Tenant1: W2 reflect high value/meaningful terms having a definition of a work group, users in the work group, whether there are any users external to the tenant, and sensitive terms associated with the work group. The high value/meaningful terms may be used to generate one or more security labels. The security labels may be used as an input to output engine 212 (e.g., to generate a user interface recommending one or more of the security labels).

Meaningful information may be extracted from the telemetry data (e.g., via a feature vector) based on a sensitivity score. The sensitivity score may be compared to a threshold value derived from leading indicators of sensitive content analyzed and/or identified in telemetry data of one or more tenants of a multi-tenant environment.

Output engine 212 may receive, acquire, and/or obtain the security labels (e.g., from model 208) generate, produce, and/or render a user interface comprising at least a description of the security labels (e.g., U.I. 214) (step 308). The description may include a recommended label name and/or a recommended listed of users who should have access to the electronic assets corresponding to and/or otherwise protected by the label.

The user interface may allow a user to select one or more labels to implement. In response to and/or subsequent to receiving an input to apply a security label (step 310), output engine 212 may publish the security label (e.g., to a corresponding tenant environment, to corresponding users, to a corresponding application, to a corresponding site, etc.) (step 312). Publishing the security label may trigger a label generation service to apply protections to one or more asset classes (e.g., sites, groups, emails, documents, and the like). A single label may provide different levels of protection (e.g., sensitivity levels) according to user groups. For example, users of an organization may have permission to edit documents while a specific group in another organization may only view the document. Protection of sites, groups, emails, documents, and the like may also include encryption and/or marking (e.g., watermark, header, footer, etc.) of electronic assets.

In an embodiment, publishing labels automatically applies the label to identified assets. In another embodiment, publishing a label makes the label available (e.g., to an application) for selection by a user. For example, a user may access a published label (e.g., from a dropdown menu of available labels) to apply the label to a document and/or other electronic asset.

Publishing a security label may trigger the label to be stored in metadata of the corresponding electronic asset. The security label may then roam with the electronic asset across applications, devices, and storage locations.

Figure 4:
FIG. 4 illustrates an operational scenario in an implementation of automatically generating security labels.

FIG. 4 illustrates operational scenario 400 in an implementation of automatically generating security labels. Operational scenario 400 includes application interface 402 to an application that employs a label generation service. For example, application interface 402 may be a user dashboard, administrator's console, and the like. Application interface 402 may include feature index 404 and task view 406.

The label generation service may automatically generate a security label (e.g., using label generation operation 300 of FIG. 3, using security label generator 136 of FIG. 1, etc.) and enable display of a description of the label (e.g., as a recommendation) in task view 406. The label generation service may automatically generate the security label in response and/or subsequent to an onboarding event (e.g., onboarding a new tenant, etc.), a merge event (e.g., one or more tenants merge assets, etc.), and the like. The label generation service may also generate a security label in response and/or subsequent to receiving a request for recommended security labels (e.g., a request for a security label to apply to a project, work group, scenario, etc.).

Security labels may be presented in an order of importance to the user and/or tenant. For example, labels that would be most meaningful and/or valuable to create (e.g., offer protection to the greatest number of documents, offer protection to a highly confidential topic, offer protection to a highly confidential workgroup and/or project, etc.) may be offered first in an order of importance in which the most important is listed first. In the present example, labels 408 are listed with the "finance only" label as the most meaningful and/or valuable to create (i.e., listed first) and the "senior leadership" label as the next most meaningful and/or valuable to create (i.e., listed second). Though the "special projects" label is listed last in the present example, additional labels may become available and/or visible in response to a user input selecting the "refresh" option and/or in response to scrolling through the list (not shown).

The description of the label may also provide a list of recommended users that defines which users should receive security policies and/or procedures related to the label. In the present embodiment, users list 410 provides the names of users associated with the "finance only," "senior leadership," and "special projects" labels. Though names of individuals are provided in the present example, it is contemplated herein that names of groups may also be used to define which users are recommended for a label. Users may be members of more than one recommendation list (e.g., Bill Vance).

The description of the label may further provide an accounting of the number of documents, emails, and/or other electronic assets that may be impacted by the security policies of the label. Meaningful terms identified and/or relied on to define the metes and bounds of the security label may also be provided in the description of the label.

Application interface 402 may provide a selectable element through which a user input may be received to select one or more of the recommended labels for publishing. In the present embodiment, a selectable text element (e.g., APPLY) is provided after the name of each recommended label, and user input 420 is received via the selectable text element. In response and/or subsequent to receiving user input 420, the "finance only" label is published to at least the 3,294 documents associated with the "finance only" label.

Figure 5:
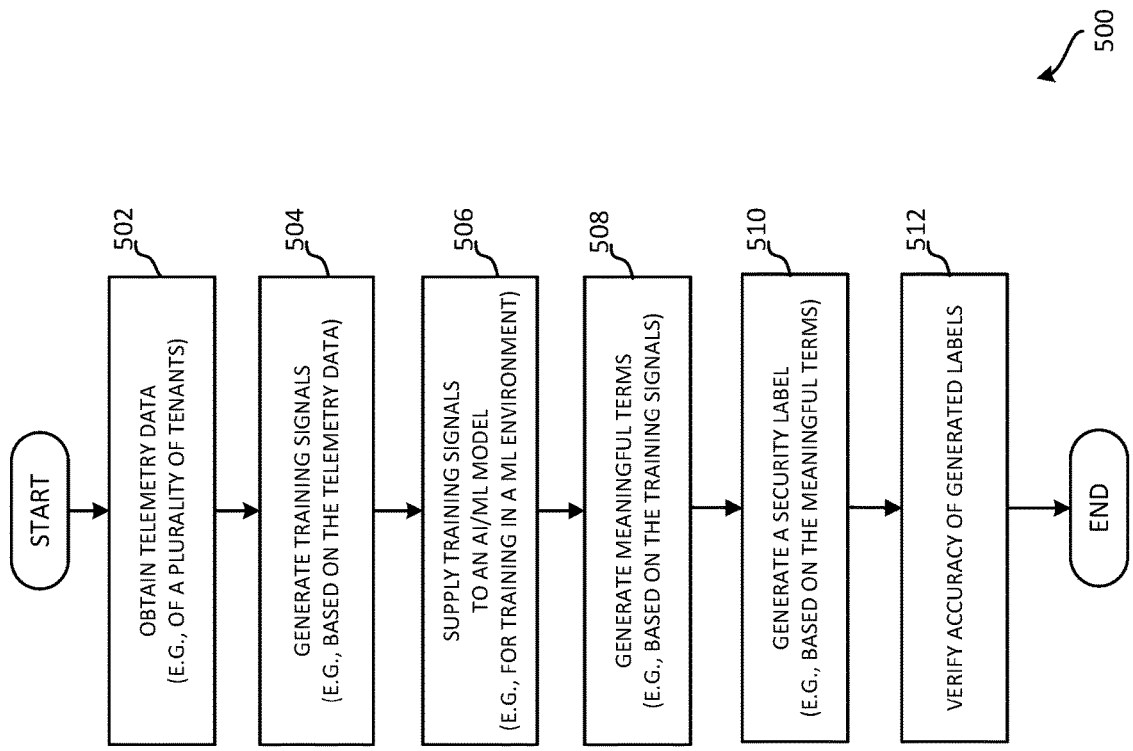
FIG. 5 illustrates a method for an implementation of automatically generating security labels.

FIG. 5 illustrates training process 500 for an implementation of automatically generating security labels. Training process 500 may be implemented, for example, in the context of training a machine learning environment to automatically generate security labels. Initially, a label generation service may access, retrieve, receive, and/or otherwise obtain telemetry data of one or more tenants (e.g., from one or more tenant environments, from a storage location hosting telemetry data, etc.) (step 502). The telemetry data may include existing security labels, operating system data, application data, usage data, tenant identifiers, event logs, diagnostics data, census data, measurement data, statistical data, and the like. The telemetry data may also comprise data collected for one or more tenants over a period of time (e.g., once a day, multiple times a day, multiple days, etc.). For example, usage logs of a tenant may be collected for a week, a month, etc. and aggregated to form a single, tenant dataset that can be stored, processed, and/or analyzed.

The label generation service may create, generate, and/or produce one or more training signals (i.e., feature vectors) based on historic telemetry data (step 504). In an embodiment, the label generation service may generate multiple training signals based on leading indicators of derived from historic telemetry data of assets that have the same, or substantially the same, exiting security label features (e.g., encryption policy, asset class, work groups etc.). In another embodiment, training signals may be manually created to identifying sensitive content, workgroups, etc.

The label generation service may supply the training signals to an AI/ML model (e.g., in a machine learning environment) (step 506). The supplied training signals may be used to generate meaningful terms that define the metes, limits, and/or boundaries of a security label (e.g., based on extracting meaningful information from the historic telemetry data) (step 508). Examples of meaningful information may include, but are not limited to, user identities, whether users are internal or external to an entity, topics that relevant users collaborate on, sensitive terms, sensitive project types, confidential information, proprietary business data, nonpublic information, the frequency of a term appearing in a project and/or communication, the frequency of a term is used by a workgroup, and the like.

In an embodiment, the label generation service may generate a security label based on the meaningful terms (step 510). For example, the label generation service may use the defined metes, limits, and/or boundaries to generate a security label comprising an encryption policy that protects the electronic assets from unauthorized access by users and/or groups not defined by the security label.

An accuracy of the generated security labels may then be verified (step 512). For example, the generated security labels may be compared to labels previously generated for content of the historic telemetry data. If the generated labels match and/or substantially match the labels previously generated for the historic content, then the accuracy of the model is positively verified. If the generated labels do not match and/or do not substantially match the labels previously generated for the historic content, then the accuracy of the model is negatively verified and the training may be performed again.

The training signals may be continuously updated as new and/or additional telemetry data is obtained, acquired, and/or generated by the plurality of tenants.

Figure 6:
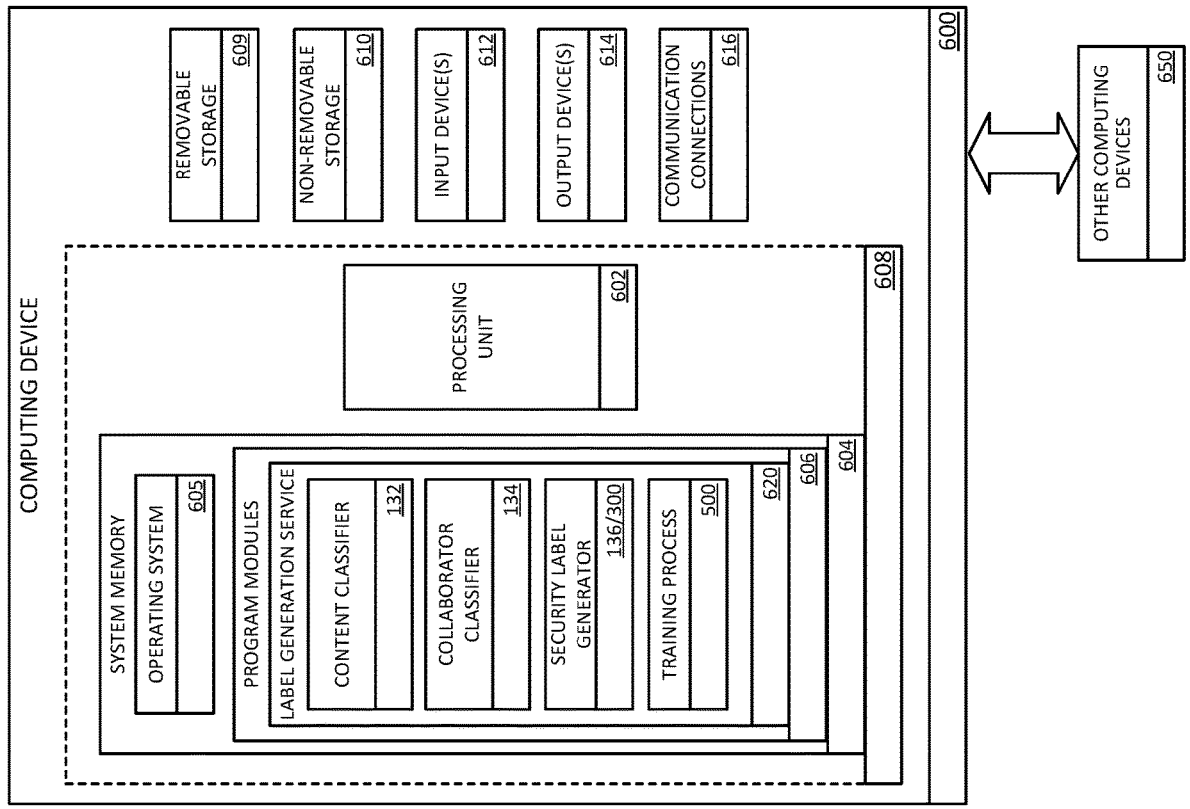
FIG. 6 is a simplified block diagram of a distributed computing system in which aspects of the present disclosure may be practiced.

FIG. 6 is a block diagram illustrating physical components (e.g., hardware) of a computing device 600 with which aspects of the disclosure may be practiced. The computing device components described below may have computer executable instructions for training or executing one or more language detection models. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 suitable for running one or more linguistic and/or natural language processing programs. The operating system 605, for example, may be suitable for controlling the operation of the computing device 600. Furthermore, embodiments of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the processing unit 602, the program modules 606 (e.g., label generation service 620) may perform processes including, but not limited to, the aspects, as described herein. Label generation service 620 may include content classifier 132, collaboration classifier 134, security label generator 136 and 300, and training process 500, which may be deployed as described in FIGS. 1-5.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing device 600 may also have one or more input device(s) 612 such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of suitable communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable, and non-removable media implemented in any method or technology for storage of information, such as computer readable instructions, data structures, or program modules. The system memory 604, the removable storage device 609, and the non-removable storage device 610 are all computer storage media examples (e.g., memory storage). Computer storage media may include RAM, ROM, electrically erasable read-only memory (EEROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer readable media does not include a carrier wave or other propagated or modulated data signal. Computer readable storage device does not include a carrier wave or other propagated or modulated data signal.

Communication media may be embodied by computer readable instructions, data structures, program modules (e.g., executable program code), or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computing device for providing security labels, comprising:
    a memory for storing executable program code;
    a processor functionally coupled to the memory; and
    the executable program code that, when executed by the processor, directs to the computing device to:
        obtain telemetry data associated with a tenant in a multi-tenant environment, wherein the telemetry data comprises information relating to a group of users collaborating on an electronic asset of the tenant;
        generate a signal based on the telemetry data associated with the tenant;
        supply the signal to a machine learning environment comprising a machine learning model that generates security labels based on the telemetry data, wherein the machine learning model comprises a collaborator classifier that:
            identifies, based on the signal, the group of user collaborating on the electronic access; and
            determines a sensitivity level of the electronic asset based at least on the group of users collaborating on the electronic asset; and
        receive, from the machine learning environment, a security label comprising a protection policy for the electronic asset of the tenant based on the telemetry data; and
        render a user interface comprising at least a description of the security label and a selectable element to apply the security label.

2. The computing device of claim 1, wherein the executable program code further directs the computing device to:
    supply the signals generated based on the telemetry data associated with a plurality of tenants within the multi-tenant environment to the machine learning environment; and
    train, based on the signals, the machine learning model to generate security labels.

3. The computing device of claim 1, wherein the machine learning environment further comprises a content classifier that identifies, based on the signal, a content of the electronic asset and determines the sensitivity level of the electronic asset based at least on the content of the electronic asset.

4. The computing device of claim 3, wherein the machine learning model generates the security label based on the sensitivity level of the electronic asset.

5. The computing device of claim 1, wherein the executable program code further directs the computing device to publish the security label in response to a selection of the selectable element.

6. The computing device of claim 1, wherein the executable program code further directs the computing device to:
    generate another security label comprising an encryption policy distinguished from the protection policy; and
    render the user interface further comprising a description of the other security label.

7. A computer-implemented method for providing security labels, comprising:
    obtaining telemetry data associated with a tenant in a multi-tenant environment, wherein the telemetry data comprises information relating to a group of users collaborating on an electronic asset of the tenant;
    generating a signal based on the telemetry data associated with the tenant;
    supplying the signal to a machine learning environment, wherein the machine learning environment comprises a machine learning model generates security labels based on the telemetry data;
    receiving, from the machine learning environment, a security label comprising a protection policy for the electronic asset of the tenant based on the telemetry data;
    receiving, from the machine learning environment, another security label comprising an encryption policy distinguished from the protection policy; and
    rendering a user interface comprising:
        at least a description of the security label;
        a description of the other security label; and
        a selectable element to apply the security label.

8. The computer-implemented method of claim 7, further comprising:
    training, based on the signals, the machine learning model to generate security labels.

9. The computer-implemented method of claim 7, wherein the machine learning environment comprises a collaborator classifier that identifies, based on the signal, a group of users collaborating on the electronic asset and determines a sensitivity level of the electronic asset based at least on the group of users collaborating on the electronic asset.

10. The computer-implemented method of claim 9, wherein the machine learning environment further comprises a content classifier that generates, based on the signal, a meaningful term that defines a limit of the security label.

11. The method of claim 10, wherein the machine learning model generates the security label based on the sensitivity level of the electronic asset and the meaningful term.

12. The method of claim 7, wherein the user interface further comprises at least a description of the security label and a selectable element to apply the security label.

13. A computer readable storage device comprising executable instructions that, when executed by a processor, cause the processor to:
   receive, by a machine learning environment comprising a machine learning model, a signal generated based on telemetry data associated with a tenant in a multi-tenant environment;
   identify, via the machine learning environment, a group of users collaborating on an electronic asset based the telemetry data, wherein the telemetry data comprises information relating to the group of users collaborating on the electronic assets of the tenant;
   determine a sensitivity level of the electronic asset based at least on the group of users collaborating on the electronic asset; and
   generate, by the machine learning model, based on the signal and by the machine learning environment, a security label based on the telemetry data, wherein the telemetry data comprises a protection policy for the electronic asset of the tenant.

14. The computer readable storage device of claim 13, wherein the executable instructions further cause the processor to:
   create a training set of labels comprising signals generated from the telemetry data associated with a plurality of tenants in the multi-tenant environment; and
   train, based on the training set of labels, the machine learning model to generate security labels.

15. The computer readable storage device of claim 13, wherein the executable instructions further cause the processor to:
   identify, via the machine learning environment, a content of the electronic asset; and
   determine the sensitivity level of the electronic asset based at least on the content of the electronic asset.

16. The computer readable storage device of claim 15, wherein the executable instructions further cause the processor to generate, via the machine learning model, the security label based on the sensitivity level of the electronic asset.

17. The computer readable storage device of claim 13, wherein the executable instructions further cause the processor to render a user interface comprising at least a description of the security label and a selectable element to apply the security label.

* * * * *